May 22, 1951 — W. A. PARKS ET AL — 2,553,935
METHOD OF MANUFACTURING CONNECTING RODS
Filed April 17, 1948

INVENTORS
W. A. Parks
J. R. Parks
BY
Lieber & Lieber
ATTORNEYS

Patented May 22, 1951

2,553,935

UNITED STATES PATENT OFFICE 2,553,935

METHOD OF MANUFACTURING CONNECTING RODS

Walter A. Parks and James R. Parks, Milwaukee, Wis., assignors to F. A. Boucha, Milwaukee, Wis.

Application April 17, 1948, Serial No. 21,598

2 Claims. (Cl. 29—156.5)

The present invention relates generally to improvements in the art of manufacturing connecting rods, and relates more particularly to improvements in the construction of connecting rods having a separable cap or two-piece head and to the method of producing such rods.

It has heretofore been customary practice in the production of two-piece connecting rods, for transmitting motion between a crankshaft and pistons of an internal combustion engine or like cases wherein a revolving crank is to be connected to a reciprocating part, to initially form the rod in one piece as by forging or casting, with an elongated head having a transverse opening therethrough, the opening being of elliptical shape or, more accurately, of a shape wherein spaced semi-circular end portions are joined by short straight side sections. Thereafter, the rod and cap portions are ordinarily divided by sawing across the head centrally between the semi-circular portions of the opening therein, thereby effecting removal of the joining straight side sections so that a substantially circular opening is obtained in the head when the parts are subsequently assembled. In this conventional method, it is necessary that the rod be initially formed with an elongated head to allow for the material necessarily removed by the sawing or parting operation, thereby resulting in the waste of material and additional undesirable disadvantages, some of which are hereinafter set forth. In addition to the waste resulting from the prior parting operations, such operations are costly and hazardous, requiring expensive cutting tools and precision work by skilled machinists operating the tools at dangerous speeds and in an atmosphere laden with metallic dust particles and chips which are difficult to dispose of satisfactorily, and without installing extremely expensive special equipment. Furthermore, the conventional methods of providing rods with separable caps necessitate additional and costly precision machining operations after the parts are separated so as to provide a satisfactory fit therebetween; and even with the precautions normally taken, it is customary practice to provide a special bearing surface over the inner peripheral surface of the head opening of the rod and to exercise utmost care in machining such bearing so as to provide a perfect bearing surface.

It is therefore a more specific object of our present invention to provide an improved method of producing a connecting rod as a two-piece rod.

Another specific object of this invention is to provide an improved method of quickly and easily separating the cap from the rod proper at minimum cost.

An additional specific object of the present invention is to provide an improved method which requires no machining of the parts at the joint thereof to provide for a perfect subsequent fit and proper matching and alinement of parts.

Still another specific object of the present invention is to provide an improved method of producing a two-piece connecting rod which comprises, providing a one piece blank having a head portion formed with a hole therethrough, weakening the head portion along a predetermined line at which it is desired to separate the same, and thereafter applying pressure to the head portion to cause separation by fracturing along approximately the weakened line.

These and other specific objects and advantages of the present improvement will be apparent from the following detailed description.

A clear conception of the several features constituting our present invention, and of the mode of constructing and of utilizing two-piece connecting rods produced in accordance with our improved method, may be had by referring to the drawing accompanying and forming a part of this specification, wherein like reference characters designate the same or similar parts in the several views.

Figure 1:
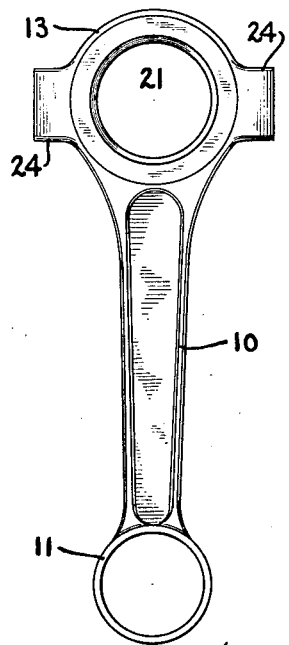
Fig. 1 is a plan view of a forging or casting from which our improved connecting rod is produced, and illustrates the initial step of our improved method.

While the invention has been shown and described herein as especially applicable to a connecting rod of a particular well-known type wherein the crank end or head is made in two separable parts, it is not intended or desired to limit or restrict the scope thereof to such specific embodiment, since the improved method may obviously be used to produce rods of different types wherein it is desired to provide separable caps at both ends.

Referring to the drawing, the improvements are illustrated as applied to a two-piece connecting rod or pitman of conventional design comprising, in general, a shank or body portion 10 having a wrist pin boss 11 formed integral therewith at one end thereof and provided with a bearing bushing 12, and a crank pin boss or head 13 at the opposite end, the head 13 being of two separable parts, namely, a saddle 14 formed integral with the shank 10 and a cap 15 removably secured to the saddle 14 by means of cap screws 16 or the like. The screws 16 are receivable in holes 17 bored in outwardly extending flanges or ears 18 of the cap 15 and tapped holes 19 provided in cooperating flanges or ears 20 of the saddle 14; and when the cap 15 is secured to the saddle 14 by means of the screws 16, a circular crank receiving opening 21 is provided.

Figure 2:
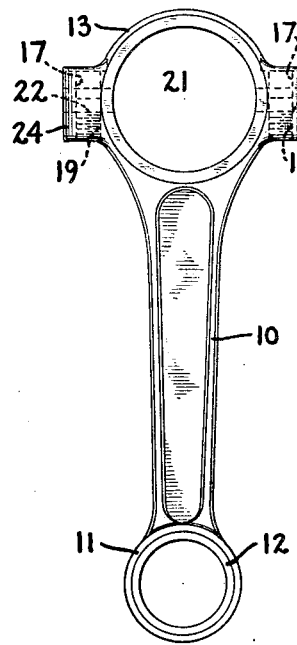
Fig. 2 is a similar plan view of the rod after the initial machining operations, and illustrates the second step of our method.
Figure 3:
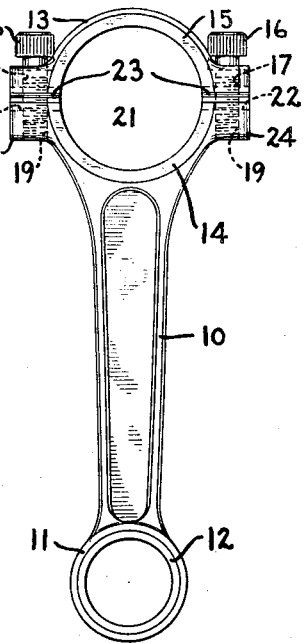
Fig. 3 is a corresponding plan view of the rod with the cap screws loosely applied to illustrate the third step of the method.
Figure 4:
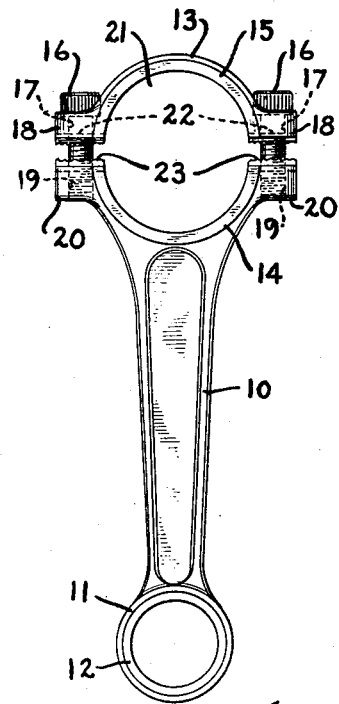
Fig. 4 is another plan view of the rod showing the cap separated therefrom by fracturing after application of pressure in accordance with the fourth step of the improved method.
Figure 5:
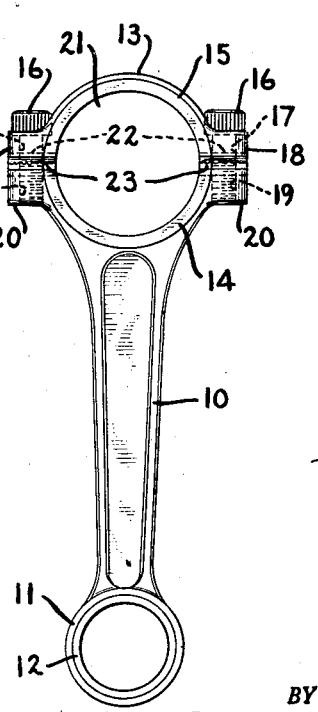
Fig. 5 is a similar plan view of the final rod with the cap screws finally tightly applied.
Figure 6:
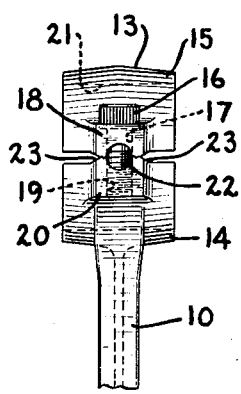
Fig. 6 is a fragmentary side view of the head portion of the improved and finally assembled rod.

The rod may be readily produced in accordance with our improved method as follows: first, by forming a one piece blank as by forging or casting, the blank being provided, as shown in Fig. 1, with an elongated shank or body 10 having an integral wrist pin boss 11 at one end and an integral crank pin boss or head 13 having integral lugs 24 and with an approximately round or cylindrical opening 21 therethrough at the opposite end; next, by machining the blank, drilling the holes 17, 19, counterboring at 17 and tapping at 19, boring alined transverse holes 22 through the lugs 24, inserting the bearing bushing 12 in the boss 11, and machining the opening 21 in the head 13 to render the same truly circular and smooth, all as illustrated in Fig. 2; thereafter forming radial grooves 23, as by sawing, milling or grinding, transversely across the head 13 on opposite sides of the lugs 24 along the approximate desired line of separation of the cap portion 15 from the saddle portion 14, causing weakening at this point, and loosely applying the cap screws 16 in the manner shown in Fig. 3; and finally applying pressure in any suitable manner to the head 13 to cause rupture and complete separation of the cap portion 15 from the saddle portion 14 by fracturing or breaking, such fracturing being caused to occur along an approximate predetermined line between the ears 18, 20 formed from the lugs 24 at the point of weakening by the grooves 23, the parts being prevented from falling apart by the loosely applied cap screws 16 as shown in Fig. 4. Thus, when the screws 16 are tightened, as shown in Figs. 5 and 6, the cap 15 will be firmly seated on the saddle 14 with the ears 18, 20 of the cap and saddle respectively being automatically alined by matching of the broken surfaces along the line 23; and if final precision machining is desirable or necessary, such machining may be performed with the parts united as shown and maintaining a truly circular bore 21.

While the diametrically opposite weakened zones 23 in the crank pin engaging head 13 have been shown and described herein as being formed in the connecting rod blank by a machining operation subsequent to formation of the blank by forging or casting, these weakened zones may obviously be provided in the initial blank simultaneous with the forging or casting thereof; and they may also assume diverse shapes other than the inwardly directed pointed grooves as illustrated. The circular opening 21 provided in the original forging or casting need not be truly circular, but considerable excess material should preferably be provided to permit subsequent accurate grinding and machining of the opening to truly circular formation. The lugs 24 formed integral with the head 13 should be of sufficient size and shape to tightly and securely receive the cap screws 16 and to provide substantial and durable pairs of ears 18, 20 on the cap 15 and saddle 14 upon rupture of the head 13 along the weakened zones 23.

Prior to application of pressure to rupture the head, the connecting rod blank obviously has an integral crank pin engaging head 13 provided with a circular bore 21 and with diametrically opposite weakened portions 23, and means, such as the cap screws or bolts 16, penetrating the weakened zones 23, as through the bore 17 and tapped hole 19, for retaining the parts in assembled condition when the zones 23 are ruptured. The weakened zones 23 may be ruptured or fractured in any suitable manner, and are preferably ruptured by application of pressure with a suitable expandable device internally of the bore 21. Since the screws 16 remain in loosely applied condition in the holes 17, 19 of the lugs 24 during the rupturing operation, the cap 15 is never entirely disconnected or dismantled from the saddle 14 which is integral with the shank 10 until the rod is applied to a crank pin; and there is consequently never any problem in matching the cap 15 to the proper rod. Furthermore, when the screws 16 are tightened, the rough fractured surfaces naturally interlock due to their matching joints, thereby causing proper alinement of the cap 15 and saddle 14 and resulting in a joint adapted to resist torque to a maximum during use. The alined, diametrically opposite, transverse holes 22 are provided primarily for lubrication purposes in actual use of the improved rod, but these holes may be formed, as shown, along the weakened zones 23, thereby aiding in the production of these zones of weakening and reducing the depth of groove necessary in such production.

From the foregoing detailed description, it will be apparent that the present invention provides an improved two-piece connecting rod which is extremely simple and durable in construction, and which may moreover be readily produced at low cost and with a minimum of operations in accordance with our improved method. Since it is unnecessary to allow for waste material removed from the head during the cap parting operation as in the conventional method of manufacture, the bore 21 may be made circular, or approximately so, in the original blank forging or casting and the head 13 need not be elongated, thereby eliminating or minimizing waste and reducing the size and weight of the initial blank for ease in handling, storage, shipping and the like. The rupturing or fracturing operation is simple and rapid and eliminates several of the customary hazardous and costly precision machining operations, and the improved method may be performed with a minimum amount of expensive equipment and a minimum number of skilled employees working under substantially dust-free conditions affording maximum pleasantness and health. The cap screws 16, which are preferable loosely applied to the head 13 prior to the breaking or rupturing operation, afford convenient means for retaining the parts 14, 15 in assembled condition when the zones 23 are ruptured and positively prevent the cap 15 from falling away from the main rod portion; and if desired, temporary screws may be utilized for this purpose during the rupturing operation. Since the cap 15 is never entirely removed from the rod until applied to the crank pin, the rod may be entirely machined in one piece, thereby expediting the machining operations and assuring matching of the cap 15 with the saddle 14. The rods produced in accordance with the present method may obviously be used in the same manner as connecting rods produced in accordance with conventional methods and may be utilized for replacement purposes as well as in new machines.

Two-piece connecting rods manufactured in accordance with the present invention have proven highly satisfactory in actual commercial use, and it has been found that the smooth internal surface of the bore 21 matches perfectly at the lines of fracture and that the joining surfaces of the cap and saddle along the lines of fracture likewise match perfectly and seat immediately upon tightening of the screws 16 to aline the parts. As hereinabove already set forth, the transverse holes 22 are provided primarily for lubrication purposes and also aid as a means for producing the weakened zones, and the grooves 23 may assume diverse forms and may be provided in the initial forged or cast blank.

It should be understood that it is not desired to limit this invention to the exact details of construction or to the precise steps of the method herein shown and described, for various modifications within the scope of the appended claims may occur to persons skilled in the art to which this invention pertains.

We claim:

1. The method of manufacturing a connecting rod from a unitary blank having a shank and an end head provided with a cylindrical opening therethrough and with diametrically opposed lugs of narrower width than the length of said head and projecting outwardly from the opposite sides of said head, which method comprises, cutting slots transversely across and inwardly from the opposite ends of said head substantially along the aforesaid diameter to said lugs to form weakened zones, and finally applying pressure to said head to cause rupture thereof along said weakened zones.

2. The method of manufacturing a connecting rod from a unitary blank having a shank and an end head provided with a cylindrical opening therethrough and with diametrically opposed lugs of narrower width than the length of said head and projecting outwardly from the opposite sides of said head, which method comprises, cutting slots transversely across and inwardly from the opposite ends of said head substantially along the aforesaid diameter and across the opposite sides of said lugs, and finally applying pressure to said head to cause rupture thereof along said weakened zones.

WALTER A. PARKS.
JAMES R. PARKS.

REFERENCES CITED

The following references are of record in the file of this patent:

UNITED STATES PATENTS

| Number | Name | Date |
|---|---|---|
| 1,440,559 | Sharpe | Jan. 2, 1923 |
| 1,498,748 | Pierce | June 24, 1924 |
| 1,630,759 | Pierce | May 31, 1927 |
| 1,831,325 | Short | Nov. 10, 1931 |
| 2,371,399 | Mantle | Mar. 13, 1945 |
| 2,448,147 | Jacobsen | Aug. 31, 1948 |